United States Patent
Rosier

[15] 3,698,116
[45] Oct. 17, 1972

[54] FISH BITE SIGNALING DEVICE

[72] Inventor: Stewart N. Rosier, P.O. Box 366, Dover R.D. 2, Washington Twp., York County, Pa. 17315

[22] Filed: July 7, 1971

[21] Appl. No.: 160,351

[52] U.S. Cl..................................................43/17
[51] Int. Cl.............................................A01k 97/12
[58] Field of Search..................................43/17, 16

[56] References Cited

UNITED STATES PATENTS 2,785,494   3/1957   Eaton............................43/17
3,020,664   2/1962   Snyder et al...................43/17

FOREIGN PATENTS OR APPLICATIONS 248,643   12/1963   Australia......................43/17

Primary Examiner—Samuel Koren
Assistant Examiner—Daniel J. Leach

[57] ABSTRACT

A fish bite signaling device wherein the flexing movements of the outboard end of a fish pole incident to fish bite activity on a fish line attached to said pole are converted into variations in the level of liquid within a container operatively associated with said fish pole together with calibrated indicia for evaluating the strength or vigor of the fish bite in terms of rise of liquid level within said container.

12 Claims, 5 Drawing Figures

PATENTED OCT 17 1972 3,698,116
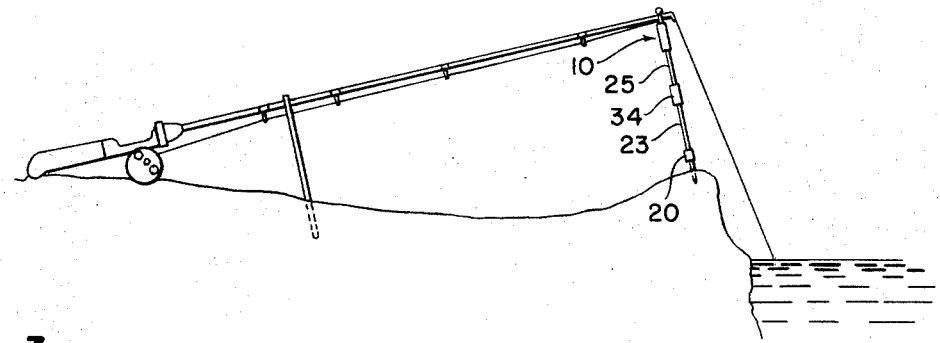
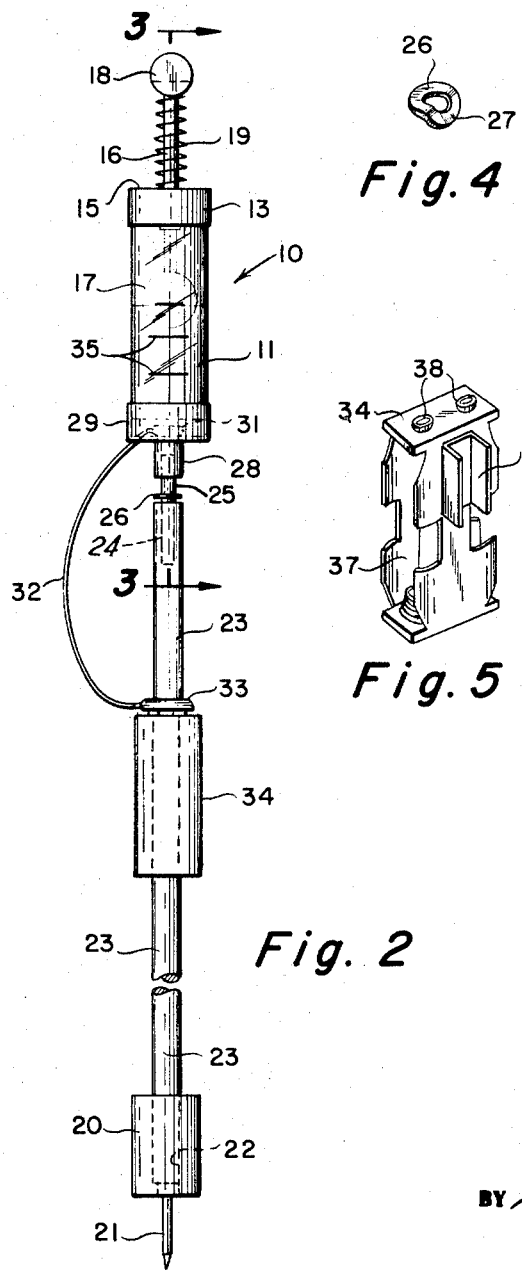
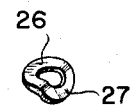
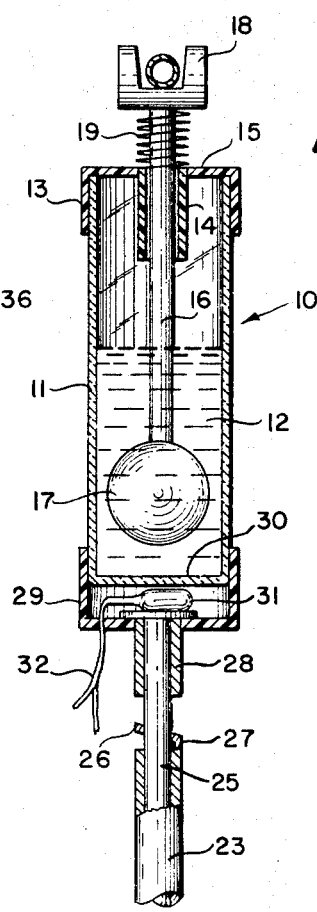
INVENTOR
Stewart N. Rosier
ATTORNEYS

3,698,116

FISH BITE SIGNALING DEVICE

This invention relates generally to fish bite signaling devices and more particularly to fish bite signaling devices designed for but not limited to use by on-shore freshwater fishermen.

In conventional on-shore freshwater fishing, the fisherman remains on shore and casts his baited line into a stream, lake or similar body of water, with a bobber attached to the fish line at a point designed to floatingly support a baited hook and/or sinker with respect to the bottom of the stream or lake, so as to place the bait at the level at which the fish are believed to be feeding.

In many instances, the fisherman were engaged in this type of fishing, will prop the fish pole up at an angle by a rock or notched stick, and then sit or recline at a point where he can watch the bobber and judge by the movements thereof when a fish is biting, and when it is time to "yank" the line to hook the fish.

The conventional bobber under these circumstances is at best, an unreliable signal source as it is subject to disturbances in the water caused by wind and waves, and is subject to becoming fouled by floating debris or by growing weeds or "snags" along the shore, and is oftentimes so far distant from the fisherman as to render it difficult to visually distinguish between "natural " movements of the bobber and those occasioned by a fish bite.

With these facts in mind, the signaling device of the present invention is disposed on shore or within the boat occupied by the fisherman at a point within close visual range of the fisherman and includes a container for housing a body of liquid, together with means for converting the flexing movements of the outboard end of the fish pole into variations in the level of liquid within said container, said means including bobber means mounted for reciprocation within said container and in contact with said liquid, a portion of the bobber means protruding from said container, together with means for mounting the container on shore or in the boat with the protruding portion of the bobber in close proximity to the outboard flexible end of the fish pole, so that when a fish "bites" on a fish line attached to said pole, the pole end is flexed into engagement with the bobber means, causing the bobber to be depressed or submerged within the body of liquid in said container with a resultant rise in the level of liquid therein. Thus, the bobber of the present invention is equally as sensitive and far more accurate in its response to a bite than is the conventional bobber.

Another object of the invention is to provide a fish bite signaling device of the character described having calibrated indicia indicative of the vigor of the fish bite.

A further object of the invention is to provide a fish bite signaling device of the character described wherein small deflections of the fish pole are in a sense magnified due to the rise of liquid level in the container which accompanies the immersion of the bobber therein. Thus, small "bites" which may go undetected with a conventional signaling device are transmitted to the fisherman to alert him to the fact that a fish is "nibbling" at the bait.

Another object of the invention is to provide illumination of the bobber means and container when desired, so that nighttime fishing is possible with the substantially same clarity of vision as to variations in liquid level as during daylight hours.

Also, the invention provides a high degree of safety to young children engaged in fishing by disposing the signaling device at a safe distance from the shore line, while maintaining the same in clear view of the fisherman.

A further object of the invention is to provide a bobber and support of the character described which is composed of several "knock-down" parts of a size for easy storing in a tackle box.

These and other objects of the invention will become apparent from a reading of the following specification in connection with the accompanying drawings, where I have illustrated a preferred form of my invention and in which:

FIG. 1 is a diagrammatic view showing the invention operatively associated with a fish pole, FIG. 2 is an elevation of the invention with parts in sections, FIG. 3 is an enlarged detail sectional view taken on the line 3—3 of FIG. 2, FIG. 4 is a perspective view of the canted lock washer, and FIG. 5 is a perspective view of the battery support.

Referring more particularly, to the drawings, the signaling unit is designated by the reference character 10, and comprising a transparent container 11 which may be of glass or plastic material. It may be of any convenient size and shape, preferably cylindrical as shown and of a length suitable to receive a body of liquid indicated by dotted lines 12 in FIG. 3. A cylindrical vial of glass or transparent plastic material, approximately 1¼ inches in diameter and approximately 3 inches in length has been found to operate satisfactorily.

The vial or container 11 is provided at its upper end with a removable closure cap 13, which includes an annular flange dimensioned to receive the upper end of the container 11, as shown in FIG. 3. The cap 13 is provided with an inwardly projecting guide tube 14 which is aligned with an axially-disposed aperture in the cap wall 15 of the cap 13. The tube 14 thus provides a guide bearing for the stem 16 of bobber 17 as shown in FIG. 3. The upper end of the stem 16 is provided with a fish pole engaging notch formation 18 and between the formation 18 and the outer surface of the wall 15 of the cap 13 and in surrounding relation to the stem 16, is a light coil spring 19. The bobber 17, stem 16, spring 19 and cap 13 are preferably assembled as a unit and by securing the lower end of the stem 16 within a bore formed in the bobber 17, the bobber and spring are maintained captive with respect to the cap 13, but are dimensioned for free sliding movement with respect to each other. The spring 19 is dimensioned so that in its normal relaxed condition the bobber element 17 is disposed within the container 11 with respect to the surface of the body of liquid 12 therein substantially as shown in FIG. 2.

The invention includes adjustable support means for the signaling unit 10, said support means comprising a socketed holder 20 provided with a spike 21 at its lower end and a rod-receiving socket 22 at its upper end. The socket 22 is dimensioned to receive the lower end of a rod member 23 provided at its upper end with a socket 24 dimensioned to receive the lower end of a rod extension 25. Loosely fitted upon the rod extension 25 is a canted lock washer 26 which by engagement of a log 27 carried thereby, with the upper end of rod 23, functions to maintain the rod extension 25 in any desired position of longitudinal adjustment with respect to the rod 23. The upper end of rod extension 25 is dimensioned to fit snugly within a tubular extension or nipple 28 fitted within an axially-disposed aperture in the outer wall of the closure cap 29, mounted on the lower end of the vial 11, in spaced relation to the bottom wall 30 of the vial as shown in FIG. 3. When thus assembled, the unit is made ready for use by removing the cap 13 with attached bobber, and depositing within the container 11 a sufficient body of liquid, such as water. Within the compartment formed by the bottom wall 30 of the vial 11 and the wall of the closure cap 29, is mounted a miniature electric light bulb 31 which has lead wires 32 threaded through apertures provided in the cap 29, said lead wires being connected to an electrical connector 33 which as shown in FIG. 2 is adapted to be connected to a pair of electric dry cells supported in a battery case 34 which may be provided with spring clips 36 by which it may be clamped to the rod section 23 of the unit support. The transparent container 11 is provided with a series of calibrated liquid level indicia 35, with the top most index line disposed at an elevation such that when the container is filled with liquid to this level, the bobber 17 will be resting on the surface of the liquid supported by the spring 19 and will be out of contact with the lower end of the guide tube 14. To render the position or degree of submersion of the bobber 17 more readily discernible, said bobber may be of a distinguishing color such as red or green. It should be noted also that the spring member 19 in addition to defining the normal position of the bobber 17 within the container 11, also places a slight resilient bias on the bobber stem 16 to load the bobber slightly against submersion. This eliminates undesired and non-bite movements of the bobber.

In use, with the container 11 supplied with liquid up to the highest line of calibration, and with a fish pole supported by its butt end as shown in FIG. 1, or similarly supported in a boat, the spike 21 of holder 20 is pushed firmly into the ground, or into a portion of the boat beneath and adjacent to the outboard end of the fish pole and the rod 23 and rod extension 25 longitudinally adjusted so that when the lower end of rod 23 is fitted within the socket 22, and the upper end of the rod extension 25 is inserted firmly within the tubular extension 28 the bobber unit 10, the pole receiving notch portion 18 of the bobber is disposed in close proximity to the under surface of the flexible outboard end of the fish pole. The desirable position is such that the pole-engaging portion 18 lies close to or touches the under surface of the pole but does not supportingly engage the pole. Thus the portion 18 of the bobber becomes a bobber-submerging means under the action of the flexing fish pole.

Reference has been made herein to the provision of means incorporated in the bobber unit of this invention, for night fishing and to this end a battery or dry cell case or support 34, such as shown in FIG. 5, is provided. The battery support 34 is provided with spring clips 36 by which the support may be attached to the rod member 23 at a point for ready attachment of the electric connector 33 to the battery terminals mounted upon the support member 34 as previously referred to.

The battery support 34 is provided with a pair of cell-receiving pockets 37–37 designed and dimensioned to receive a pair of conventional "pen-type" dry cells, which through internal electrical connectors (not shown) are in electrical contact with external plug contacts 38, with which the connector 33 is designed to be connected when it is desired to energize the light bulb 31 to illuminate the unit 10 for night fishing. In this connection it should be noted that the container 11, the tubular extension 28, the rod 23 and rod extension 25, and the bobber 16 and stem 17 and engaging portion 18 may all be made of a "Lucite" type plastic whereby all become light-transmitting when the bulb 31 is energized, and that light is projected from the bulb upwardly through the bottom 30 and downwardly through the tubular extension 28.

In view of the foregoing, it is apparent to those skilled in the art that the signaling device of this invention, while being mounted ashore or on the boat occupied by the fisherman, will give the fisherman a close-up view of the movements of the bobber as effected by forces imposed on the fish line due to fish activity while remaining substantially unresponsive to surface turbulence or disturbance of the water, floating debris, inshore weeds, "snags", etc. Furthermore, by the simultaneous rise of the liquid level within the container with the submersion of the bobber within the liquid in said container, the apparent movement of the bobber and/or degree of submersion within the container is in a sense magnified or amplified, thus alerting the fisherman to "nibbles" which might otherwise go undetected.

It should be noted that the cap 29 is preferably secured rigidly to the vial by a thermo-sensitive adhesive which will provide secure attachment of the cap but which will permit ready removal of the cap for replacement of the light bulb by immersing the vial and cap in hot water to soften the adhesive.

It should be understood that while the invention has been described as being useful to "fresh-water" "on-shore" fishermen, it will be apparent to those skilled in the art that such reference herein includes fishing from all stationary installations such as wharfs, docks, sea walls and the like, whether the water be "fresh" or "-salt" and that under proper conditions of wind and wave, the invention may be used with rewarding results by those who prefer to fish from boats.

Having thus described the invention, what is claimed as new is:

1. A fish bite signaling device comprising a container adapted to receive a body of liquid, bobber means disposed within said container and movably supported therein for contact with the surface of said body of liquid, bobber submerging means operatively associated with said bobber means and disposed exteriorly of said container, and means for supporting said container with the bobber-submerging means in close proximity to the outboard end of a flexible fish pole and in position to be engaged by said pole when deflected by forces imposed thereon incident to a fish bite activity on a fish line attached to said fish pole, whereby said bobber means becomes submerged within said liquid to an extent dependent upon the vigor of said fish bite.

2. The apparatus described in claim 1 wherein said container is transparent so that changes of liquid level within the container due to displacement of said liquid in response to submergence of said bobber within said liquid are clearly visible.

3. The apparatus described in claim 2 wherein said liquid is transparent and wherein the bobber means includes a colored body member in contact with said liquid.

4. The apparatus described in claim 2 wherein one of the container and bobber means is provided with calibrations indicative of the degree of displacement of the liquid within the container due to the submergence of the bobber means therein.

5. The apparatus described in claim 4 wherein said calibrations are on the container wall.

6. The apparatus described in claim 1 wherein said bobber means includes means for resiliently supporting the same within said container and for biasing the bobber against submersion to a desired degree to preclude false liquid displacement indications due to minor forces exerted on said bobber-submerging means incident to forces other than fish bites imposed on said fish line.

7. The apparatus described in claim 6 wherein, said container is provided with a removable closure cap through which said bobber-submerging means slidingly extends, said bobber means, said resilient biasing means and said closure cap being removable from the container as a unit.

8. The apparatus described in claim 2 wherein means are provided which define with a transparent wall portion of said container a compartment separate from the liquid-containing portion thereof, and a source of illumination housed within said compartment serving to illuminate the interior of said container and bobber means when said source of illumination is energized.

9. The apparatus described in claim 1 wherein said container-support means includes a sectional rod means, together with means for longitudinally adjusting the sectional rod means to facilitate proper positioning of the bobber-submerging means with respect to a fish pole.

10. The apparatus described in claim 9 wherein means are provided for releasably locking said rod sections in an adjusted position.

11. A "bite" signaling device for fish lines comprising a container adapted to receive a body of liquid, an apertured closure member for said container, a bobber element supported on said closure member for reciprocating movement, the bobber element including a body portion disposed within the container in predetermined contact with the body of liquid therein, said bobber element including a stem portion projecting therefrom and extending through said apertured closure to provide, exteriorly thereof a portion adapted to be engaged by a fish pole when flexed in response to fish bite activity on a fish line connected to said pole, and adjustable support means for positioning the container with the pole-engaging portion of the bobber in close proximity to said fish pole whereby flexures of the pole due to fish bite activity on said line are converted into corresponding reciprocatory movements of the bobber element to cause corresponding displacements of liquid within the container, and indicia for indicating the degree of such liquid displacement as a measure of the vigor of the fish bite.

12. The apparatus described in claim 8 wherein means are provided for mounting a source of electrical potential on said support means, and electrical connector means for connecting said source of potential to said source of illumination.

* * * * *